Figure 1:
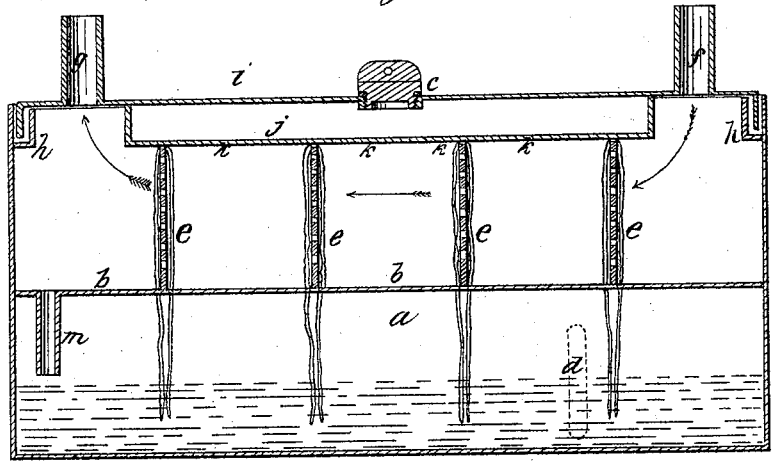

W. H. BUCKLAND.
Carbureter.

No. 46,432.

2 Sheets—Sheet 1.

Patented Feb. 14, 1865.

Witnesses:

Inventor:

W. H. BUCKLAND.
Carbureter.

No. 46,432.  2 Sheets—Sheet 2.

Patented Feb. 14, 1865.

Witnesses:

Inventor:
W. H. Buckland
per Munn & Co.
attys

UNITED STATES PATENT OFFICE.

WILLIAM HENRY BUCKLAND, OF LONDON, ENGLAND.

IMPROVED APPARATUS FOR CARBURETING AIR.

Specification forming part of Letters Patent No. 46,432, dated February 14, 1865.

*To all whom it may concern:*

Be it known that I, WILLIAM HENRY BUCKLAND, of Barge Yard, in the city of London, gentleman, a subject of the Queen of Great Britain, have invented improvements in the mode of and in the apparatus for producing gas for illuminating and heating purposes, parts of which improvements are also applicable for increasing the illuminating and heating power of ordinary lighting-gas; and I do hereby declare that the following is a full and exact description of my said invention.

My invention of improvements in the mode of and apparatus for producing gas for illuminating and heating purposes, parts of which improvements are also applicable for increasing the illuminating and heating power of ordinary lighting-gas, relates to an improved mode of combining or impregnating ordinary atmospheric air with such a quantity of volatile hydrocarbon as will render it a combustible and illuminating gas, which may be burned in any suitable burner for heating purposes, or in ordinary gas-burners, in place of the ordinary carbureted hydrogen for lighting purposes.

My invention is also applicable for carbureting ordinary illuminating gas, and by that means increasing its lighting power, and I accomplish this without causing the gas or air to pass through the liquid hydrocarbon and without the use of a wick, but by causing a current of air or gas under a suitable pressure to pass through a vessel containing a porous mass or material, which is kept saturated with any suitable hydrocarbon. To this end I charge a vessel or chamber with a mass of porous sponge or with pieces of sponge, softstone, wood, wool, cotton, or charcoal, or with sheets, layers, strips, or pieces of woolen, linen, cotton, or other cloth, or with a mass, pieces, sheets, layers, or strips of any porous material which will absorb and retain liquids, and which porous materials are to be kept saturated with the liquid hydrocarbon. The gas or air, in its passage through, along, against, or over the surface of the porous mass or material saturated with the liquid hydrocarbon, will vaporize and carry off a portion of the hydrocarbon, and sufficiently hold the same in suspension until the gas or air so carbureted reaches the burner, where it is to be consumed.

According to the arrangement of parts for carrying out my invention, the carbureting-vessel is divided into two compartments, in one of which is placed a porous mass or material, and into which the liquid hydrocarbon is first introduced, for the purpose of saturating the porus mass or material. The excess of the liquid hydrocarbon beyond what is required for such saturation passes into the other compartment, into which there are apertures sufficient to permit portions of the porous mass or material to project or extend and dip into the liquid hydrocarbon which has passed into the second compartment. By this means the porous mass or material in the first compartment continues by capillary attraction to be saturated with hydrocarbon, and will supply the place of the portion of the hydrocarbon which has been carried off in combination with the gas or air. At the same time the surface of the liquid hydrocarbon in the second compartment will be protected from coming in contact with the gas or air.

By introducing partitions into the first compartment of the vaporizing or carbureting vessel, I can increase at pleasure the surface of the saturated mass or material and compel the gas or air to pass through, over, or against the whole extent of the same, thereby adding more or less to the illuminating power of the carbureted gas or air. I use either cold or warm gas or air, according to circumstances, or the carbureting-vessel may be furnished with a jacket, to contain either warm or cold water, so that the vessel may be either warmed or cooled, as may be required.

In the accompanying drawings, Fig. 1 is a longitudinal vertical section of one form of carbureting apparatus.

$a\ a$ is a rectangular or other conveniently-shaped vessel, which is divided into two compartments by means of a false bottom, $b$. The space below this false bottom $b$ is supplied through a suitable opening with any suitable hydrocarbon, and the quantity contained in the lower compartment will be clearly seen on the graduated-glass index-tube $d$ at one end of the apparatus. The upper compartment of the vessel $a$ is what may be termed the carbureting-chamber. It is provided with a series of vertical transverse partitions $e\ e$, which are made of perforated metal and are loosely covered with flannel, cotton, or other fabric, the lower ends of which pass down through slots in the false-bottom $b$ and dip into the liquid hydrocarbon beneath. The bottom of the upper compartments or carbureting chamber may also be loosely covered with cotton, wool, or other porous material. The air or gas to be carbureted will enter the vessel through the opening $f$, and by passing along, to and fro, against, or in front of the saturated porous or textile fabric, will ultimately issue from the apparatus out of the aperture or exit-pipe $g$. The carbureting-chamber is surrounded by a jacket, $h\ h$, thereby leaving a space which may be supplied with either hot or cold water, if desired.

The vessel $a$ has a cover, $i$, which in this example of my invention, is fitted with the gas or air induction and eduction pipes $f$ and $g$, and also with the opening or man hole $c$, for supplying liquid hydrocarbon to the vessel. The rim of the cover is bent down at a right angle all around it, to fit within the water-jacket or channel $h$, and thus make a tight joint on all sides. The cover has also a chamber, $j$, which extends on all sides nearly to the rim of the cover, and whose bottom is provided with longitudinal openings or slits $k$, to permit the hydrocarbon to pass into the vessel $a$. The false bottom $b$ is perforated and fitted with a tube at $m$ beneath the gas or air eduction-pipe $g$, to allow any liquid which may collect there, from condensation or other cause, to be returned to the lower division of the vessel.

Figure 2:
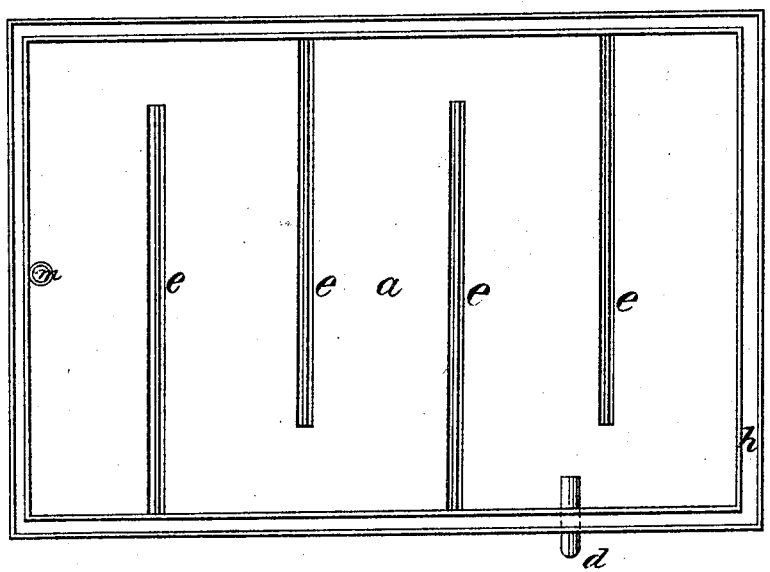
Figure 3:
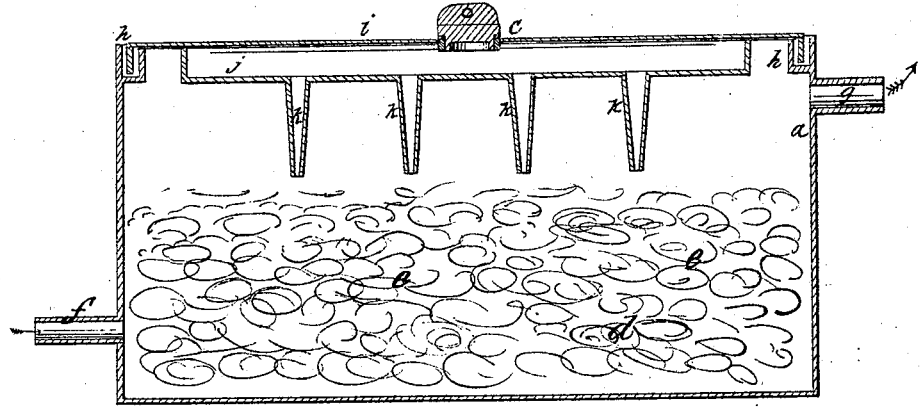
Figure 4:
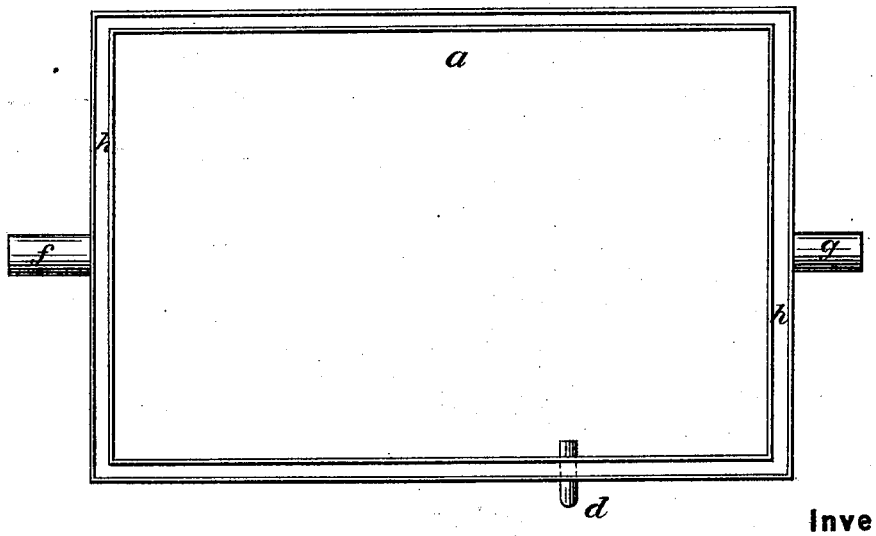

Fig. 2 is a plan of the interior of the vessel shown in Fig. 1, wherein the arrangement of the partitions $e$ is set forth.

The cover $i$ is provided with a cap, $c$, to close the aperture through which the hydrocarbon liquid is introduced.

$j$ is a distributing-floor, having a number of perforations, $k\ k$, by which the liquid may be delivered in a shower within the apparatus.

Having thus described my invention, what I claim as new therein, and desire to secure by Letters Patent, is—

The gas apparatus, herein represented and described, consisting of the reservoir $a$, false bottom $b$, perforated partition $e\ e$, (covered with fibrous material,) inlet-aperture $f$, and exit $g$, all constructed, arranged, and operating as specified.

In witness whereof I, the said WILLIAM HENRY BUCKLAND, have hereunto set my hand and seal the 1st day of September, in the year of our Lord 1864.

W. H. BUCKLAND. [L. S.]

Witnesses:
 FRED. WALKOLM,
  66 *Chancery Lane, London.*
 M. WYNN.
  24 *Royal Exchange, London.*